United States Patent [19]

Nagase et al.

[11] Patent Number: 5,242,865
[45] Date of Patent: Sep. 7, 1993

[54] NON-MAGNETIC SUBSTRATE OF MAGNETIC HEAD

[75] Inventors: Ryuichi Nagase; Hiroshi Hosaka; Hifumi Nagai; Ryo Suzuki, all of Saitama, Japan

[73] Assignee: Nippon Mining Co., Ltd., Tokyo, Japan

[21] Appl. No.: 805,173

[22] Filed: Dec. 11, 1991

[30] Foreign Application Priority Data

Dec. 12, 1990 [JP] Japan ................................. 2-409874
Feb. 25, 1991 [JP] Japan ................................. 3-50261
Apr. 30, 1991 [JP] Japan ................................. 3-124614
Oct. 30, 1991 [JP] Japan ................................. 3-310013
Oct. 31, 1991 [JP] Japan ................................. 3-311489

[51] Int. Cl.$^5$ ............................................. C04B 35/00
[52] U.S. Cl. ........................................ 501/1; 501/94; 501/103; 501/105
[58] Field of Search ..................... 501/1, 94, 103, 105

[56] References Cited

U.S. PATENT DOCUMENTS 4,540,638  9/1985  Sakakitnara et al. ............. 501/1 X
5,089,196  2/1992  Itoh et al. ............................ 264/65

FOREIGN PATENT DOCUMENTS 119869    9/1984   European Pat. Off. .
194650    9/1986   European Pat. Off. .
330121    8/1989   European Pat. Off. .
1-108711  4/1989   Japan .
1-287811  11/1989  Japan .
2-154307  6/1990   Japan .
2-168602  6/1990   Japan .

OTHER PUBLICATIONS

Boskovic et al, *Transactions J. British Ceramics Soc.*, 75 No. 5, pp. 107–112 (Sep. 1976).

*Primary Examiner*—Karl Group
*Attorney, Agent, or Firm*—Armstrong, Westerman, Hattori, McLeland & Naughton

[57] ABSTRACT

A non-magnetic substrate for use in a magnetic head, consists of the basic composition consisting of CoO and NiO or NiO, and (a) from 0.1 to 7% by weight of $ZrO_2$ and $HfO_2$ based on 100% of the basic composition, or (b) from 0.1 to 7% by weight of $ZrO_2$, and from 0.1 to 2% by weight of $Al_2O_3$. Cracking of the magnetic-layer structure is prevented.

5 Claims, 2 Drawing Sheets

NON-MAGNETIC SUBSTRATE OF MAGNETIC HEAD

BACKGROUND OF INVENTION

1. Field of Invention

The present invention relates to a non-magnetic substrate of a magnetic head, for vapor-depositing a metallic magnetic layer thereon. The present invention also relates to a magnetic head, in which the above mentioned substrate is used. The non-magnetic substrate according to the present invention is suited for producing magnetic heads, in which thin layers of Fe-Si-Al alloy are used. Such magnetic heads are appropriate for use at a high frequency and as high density-recording heads, such as videoheads and digital heads, in which a high S/N ratio is required. The present invention also relates to the method of producing the non-magnetic substrate of magnetic heads.

2. Description of Related Arts

The recent increase of recording density in the field of magnetic recording technique is outstanding. Along with this, not only are electro-magnetic transducers required to provide an increasingly narrower track width, but also the core material of magnetic heads is required to have increasingly higher levels of saturation magnetization and permeability in a high frequency region. In recent years, attention has increasingly been paid to a thin layer laminate type magnetic head, in which thin magnetic layers of Fe-Si-Al alloy are laminated and which could fulfill the requirements mentioned above in the field of magnetic recording.

An example of the magnetic heads is illustrated in FIGS. 1 and 2. Its structure is briefly described below.

BRIEF DESCRIPTIONS OF THE DRAWINGS

Figure 2:
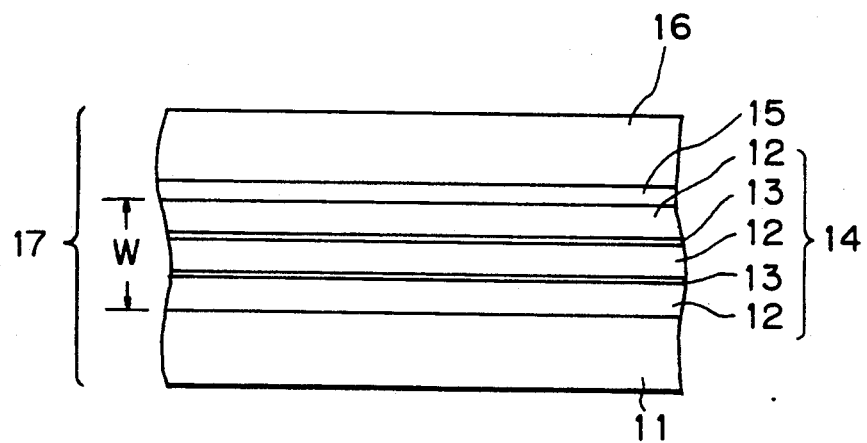
FIG. 2 is a partial cross sectional front view of the layers of the magnetic head.

Referring to FIG. 2, the substrate 11 consists of non-magnetic material. Fe-Si-Al alloy is formed on the substrate 11 as a magnetic alloy layer 12 having a thickness of from 1 to 20 $\mu$m. On the magnetic alloy layer 12 a non-magnetic insulating layer consisting of $SiO_2$ is then formed as the intermediate insulating layer 13 having a thickness of from 0.03 to 0.5 $\mu$m.

The magnetic alloy layers 12 and the intermediate insulating layers 13 are laminated onto each other until a requisite number of layers is obtained. Thickness and numbers of the magnetic alloy layers 12 and intermediate insulating layers 13 are appropriately determined to provide a magnetic layer-structure 14 having the track width w (FIG. 2).

A glass layer 15 is formed on the magnetic layer-sturcture 14, and the other non-magnetic substrate 16 is laminated on the glass layer 15. $SiO_2$-$B_2O_3$-ZnO series bonding glass is used for the glass layer. The non-magnetic substrate 16 is produced with the use of the same material as in the above mentioned substrate 11.

A laminate-layer structure 17 produced as described above is then cut through the laminate structure. A pair of blocks, i.e., core halves 18, 19 are thus produced. A groove(s) for winding 20 is formed on at least one of the core halves, i.e., the core half 18 in the present example.

In order to strengthen the bonding of abutting surfaces of both core half blocks 18 and 19, chamfers 22 are formed. In the present example, the chamfers 22 are formed on the core half 19 at top and bottom of the abutting side, one of which is opposite winding groove 20. A recess 23 is formed on core half 18 on the abutting side opposite groove 20. The abutting surfaces of both core halves 18, 19 are then polished, and subsequently a non-magnetic gap-spacer 21 consisting of $SiO_2$ is formed between both core halves.

Both core halves 18 and 19 are then abutted at the abutting surfaces. PbO-$B_2O_3$ series molding glass is then filled in chamfers 22 and recess 23 to bond the core halves 18 and 19.

Both core halves 18 and 19 are finally subjected to forming, such as polishing, to form a rounded surface, on which the tape will slide. A wire is then wound around the core halves to complete the production of a magnetic head 10.

During the production of magnetic head 10, the magnetic alloy layers consisting of Fe-Si-Al series alloy are deposited on the non-magnetic substrate to a thickness of from a few $\mu$m to several tens of $\mu$m by means of the known physical vapor deposition methods, such as the vacuum deposition, sputtering, ion plating, and the like. The magnetic alloy layers are then heat treated at 500° to 700° C. under vacuum to improve the magnetic properties.

Conventionally, barium titanate, calcium titanate, alumina and the like are used for the application to the non-magnetic substrate of the above described type magnetic head. However, since the coefficient of thermal expansion is greatly different from that of the metallic magnetic layer-structure, it is liable to peel from the non-magnetic substrate, on which the former is deposited. In addition, due to the difference in the coefficient of thermal expansion, an extremely great tensional or compressional stress is generated in the molding glass filled in the chamfers 22 and the like, with the result that the molding glass occasionally cracks.

In order to eliminate the above drawbacks, the present inventors conducted a study of oxide ceramics and found that the oxides, basically composed of CoO and NiO are effective. The oxide compositions are disclosed in Japanese Unexamined Patent Publications Nos. 1-287,811 and 2-168,602, and Japanese Patent Application No. 1-214,206.

The present inventors further investigated the additives which can enhance the hardness and density of the basic composition of CoO or NiO. The present inventors confimed the effectiveness of the following compositions to the substrate of a magnetic head. One of the compositions is a basic composition with from 0.1 to 5% by weight of an additive(s) consisting of MnO, $TiO_2$, $Al_2O_3$ and CaO. The other composition is a basic composition with one of the additives consisting of from 1 to 5% by weight of $Y_2O_3$, from 0.1 to 1% by weight of TiN, and from 1 to 5% by weight of $SiO_2$. It was also confirmed that these additives realize the intended functions. The disclosure in this regard is made in Japanese Unexamined Patent Publication No. 2-94,408, and Japanese Patent Application Nos. 1-159,622 and 1-214,208.

In Japanese Unexamined Patent Publication No. 2-154,307, a non-magnetic substrate for use in a magnet head is disclosed, whose basic composition is NiO and CoO or NiO. The non-magnetic substrate consists of from 25 to 80 mole % of CoO 0 to 50 mole % of MO, and from 5 to 20 mole % of $XO_2$ (M is at least one of Ni and Mn, and X is at least one of Ti, Zr and Hf). The coefficient of thermal expansion of this non-magnetic material is decreased to a level in the range of from 10.0 to 12.5 $\mu m/m°$ C., because the additive amount of $ZrO_2$ exceeds 5 mole % (8% by weight). This coefficient of thermal expansion is much lower than that of the metallic magnetic layer. As a result, such problems arise that the non-magnetic substrate and metallic magnetic film may deform or crack due to the difference in the coefficient of thermal expansion thereof. There arises therefore the necessity for the coefficient of the non-magnetic substrate to be so high as to be close to that of the magnetic layer-structure.

In Japanese Unexamined Patent Publication No. 2-94,407 the present applicant has disclosed a method which is appropriate for producing a non-magnetic substrate for use in a magnetic head, whose basic composition is CoO and NiO or NiO. The production process consists of steps of: (1) blending and then sieving the raw-material powder; (2) CIP (cold isostatic pressing) shaping the mixed powder, calcining the same, crushing, and then sieving; (3) finely milling the calcined powder to a size finer than 1 $\mu m$ or less; (4) granulating the fine powder to a spherical shape with a size of 20 $\mu m$ or more; (5) CIP shaping the granulated powder to form a green compact; (6) sintering the green compact; and, (7) HIP (hot isostatic pressing) densifying the sintered compact.

SUMMARY OF THE INVENTION

It is therefore an object of the present invention to provide, for a non-magnetic substrate, a material which has virtually the same coefficient of thermal expansion as that of the metallic magnetic layer, specifically from 12.5 to 15.0 $\mu m/m°$ C., and which has high Vickers hardness.

It is another object of the present invention to provide, for a non-magnetic substrate, a material which not only has the desired coefficient of thermal expansion and high Vickers hardness but also has a dense sintered structure.

It is a further object of the present invention to provide a magnetic head, which has improved wear-resistance and, in which is prevented cracking which occurs when the metallic magnetic layer is deposited on the non-magnetic substrate.

It is yet another object of the present invention to provide a method for producing a non-magnetic substrate, in which the cracking thereof is prevented during production.

The present inventors further tested additives added to the basic composition consisting of CoO and NiO or NiO, and then discovered that the desired coefficient of thermal expansion and hardness can be fulfilled by adding from 0.1 to 7% by weight of at least one of $ZrO_2$ and $HfO_2$ to the basic composition. It was also discovered that either non-stabilized or partially stabilized zirconia ($ZrO_2$) attains the desired properties, but the attainment by the latter is considerably better than that by the former.

In accordance with the present invention, there is therefore provided a non-magnetic substrate for use in a magnetic head, said substrate being comprised of the basic composition consisting of CoO and NiO or NiO, and from 0.1 to 7% by weight of an additive based on 100% of the basic composition, said additive being at least one of $ZrO_2$ and $HfO_2$.

It was discovered in the above NiO(-CoO)-$ZrO_2$ composition, with $ZrO_2$ content of from 0.1 to 7% by weight of $ZrO_2$, that added $ZrO_2$ suppresses the crystal growth of NiO(-CoO), thereby refining the crystal structure. On the other hand, $ZrO_2$ suppresses the sintering; that is the sintering around the $ZrO_2$ particles is not promoted, thereby increasing the defects in the grain boundaries. The sintered compact obtained may not have a desirably dense structure for use in the non-magnetic substrate.

In accordance with the present invention, there is therefore provided a non-magnetic substrate for use in a magnetic head, said substrate having fine diameter of crystal grains and a dense sintered structure. The substrate comprises the basic composition consisting of CoO and NiO or NiO, and further comprises based on 100% of the basic composition from 0.1 to 7% by weight of $ZrO_2$, and from 0.1 to 2% by weight of $Al_2O_3$. $ZrO_2$ is preferably partially stabilized but may be non-stabilized.

In accordance with the present invention, there is provided a magnetic head, which comprises: a magnetic-layer structure consisting of a plurality of metallic magnetic layers and non-magnetic insulating layers sandwiched between the magnetic layers; and non-magnetic substrates, between which the magnetic-layer structure is sandwiched, characterized in that the non-magnetic substrate for use in a magnetic head, comprises the basic composition consisting of CoO and NiO or NiO, and from 0.1 to 7% by weight of an additive based on 100% of the basic composition, said additive being at least one or $ZrO_2$ and $HfO_2$.

Another magnetic head according to the present invention comprises: a magnetic-layer structure consisting of a plurality of metallic magnetic layers and non-magnetic insulating layers sandwiched between the magnetic layers; and non-magnetic substrates, between which the magnetic-layer structure is sandwiched, characterized in that the non-magnetic substrate for use in a magnetic head comprises the basic composition consisting of CoO and NiO or Nio, and further comprises based on 100% of the basic composition from 0.1 to 7% by weight of $ZrO_2$, and from 0.1 to 2% by weight of $Al_2O_3$.

A method according to the present invention for producing a non-magnetic substrate comprises (1) calcining (a) a raw material which comprises the basic composition consisting of CoO and NiO or NiO, and further comprises from 0.1 to 7% by weight of an additive based on 100% of the basic composition, or (b) a raw material which comprises the basic composition consisting of CoO and NiO or NiO, and further comprises based on 100% of the basic composition from 0.1 to 7% by weight of $ZrO_2$, and from 0.1 to 2% by weight of $Al_2O_3$, (2) crushing the calcined compact, (3) CIP shaping the calcined powder to obtain a green compact, (4) sintering the green compact, and (5) HIP densifying the sintered compact. If necessary, the CIP shaping of the raw material may be carried out prior to the calcination of the raw material, and/or the calcined powder may be granulated to a spherical powder, which is then subjected to the CIP treatment.

The present invention is hereinafter described specifically and in detail to facilitate the understanding thereof.

DESCRIPTION OF PREFERRED EMBODIMENTS

The basic composition is NiO oxide alone or the composite oxide of NiO and CoO. The composite oxide is, for example, CoO/NiO (mole ratio)=0/100-80/20, more preferably CoO/NiO(mole ratio)=3/97-60/40.

$ZrO_2$ and $HfO_2$ are materials which effectively suppress the grain growth of the basic-composition crystals. The coarsening of the crystals is therefore prevented by these materials. When the amount of these materials added is 0.1% by weight or more, the diameter of the basic-composition crystals decreases to enhance the hardness. However, since the coefficient of thermal expansion of $ZrO_2$ and $HfO_2$ is smaller than the NiO and CoO, the amount of the former material added should be 7% by weight or less. The preferable amount of addition is from 1 to less than 3% by weight.

$ZrO_2$ used as an additive is preferably partially stabilized, because change in its properties due to the phase transformation is not desirable for, for example, wear-resistance. Martensitic transformation from monoclinic to the cubic system of $ZrO_2$ occurs at approximately 1170° C., when temperature is elevated, while inverse transformation occurs at 900°-1000° C. as the temperature falls. During the transformation from the monoclinic to the cubic system, and $ZrO_2$ undergoes a great volume change, which exerts a serious influence upon the sinterability of $ZrO_2$. A stabilizing agent is added to $ZrO_2$ to suppress its transformation. Partially stabilized $ZrO_2$ is preferred to the fully stabilized $ZrO_2$, because the amount of the stabilizing agent is small, and further, a stabilizing agent in too great an amount may impair the properties of a non-magnetic substrate. A preferred stabilizing agents are yttrium oxide, calcium oxide, magnesium oxide and cerium oxide. Preferred amount of at least one of the stabilizing agents is from 1 to 17 mole % based on the total of $ZrO_2$ and stabilizing agent(s).

The composition consisting of the basic component, i.e., NiO (—CoO), and from 0.1 to 7% by weight of $ZrO_2$, i.e., the additive to the basic composition, has finer grain-size than the composition free of the additive, and also has exceedingly higher deflecting strength and wear-resistance than those of the composition free of the additive. However, a dense sintered compact, i.e., one having a high density, may not be obtained, unless sintering at a high temperature occurs. One of the causes of this is that the fact $ZrO_2$ is difficult to sinter as compared with NiO and CoO of the basic composition, which impedes the sintering reaction at its interface, and increases the defects. The present inventors discovered that $Al_2O_3$ added to the above basic NiO(—CoO) composition as the reaction promoter promotes the sintering reaction without incurring a disadvantage of an additive, that is, impairing the refining of the crystal grains. When the amount of $Al_2O_3$ is added less than 0.1% by weight, its effect as the mineralizer is too small to obtain a dense sintered compact. When the additive amount is more than 2% by weight, a reaction between $ZrO_2$ and $Al_2O_3$ is promoted, thus forming a low-melting compound, with the result that the crystal grains of $ZrO_2$ are coarsened. When the thus sintered compact is worked by dicing, a great amount of unwanted chipping occurs. The additive amount of $Al_2O_3$ is therefore in the range of from 0.1 to 2% by weight.

A method for producing the non-magnetic substrate is hereinafter described.

Commercially available oxides are used as the raw materials, which are weighed to provide the desired composition, and are blended by a ball mill. The blending is carried out in a wet ball mill for 10 to 30 hours. For example, ethanol is used as the liquid medium of the ball mill. After drying, the blended powder is CIP shaped to obtain a green compound. This is then calcined at a temperature of from 850° to 1100° C., for example, in an Ar atmosphere. The calcined powder is roughly crushed by a crusher, followed by sieving with a 100-200 μm mesh. The calcined and then sieved powder is treated for 20-72 hours in a wet ball mill with ethanol as the liquid medium, so as to finely mill the powder to 1 μm or less. The fine powder is granulated and then CIP shaped. The sintering is then carried out, for example, at 1230° to 1400° C. in an $O_2$ atmosphere. The HIP densifying is then carried out. The HIP condition is desirably at a pressure of 80-120 MPa, a temperature of 1200°-1350° C., and treating time of 1-2 hours.

The sintered compact produced by the above described process is dense and has a rock-salt structure. Its properties are improved over the conventional one, resulting in a reduction of the wear and cracks at the edge of a substrate due to the sliding of a magnetic recording tape.

Hereinafter is described a method for producing a thin-layer laminate magnetic head by using the substrates produced as described hereinabove.

Figure 1:
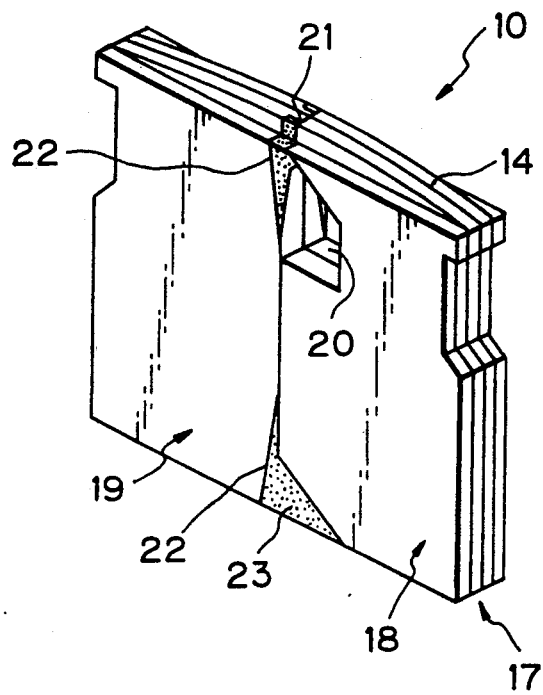
FIG. 1 is an elevational view of a thin-layer laminate type-magnetic head.
Figure 3:
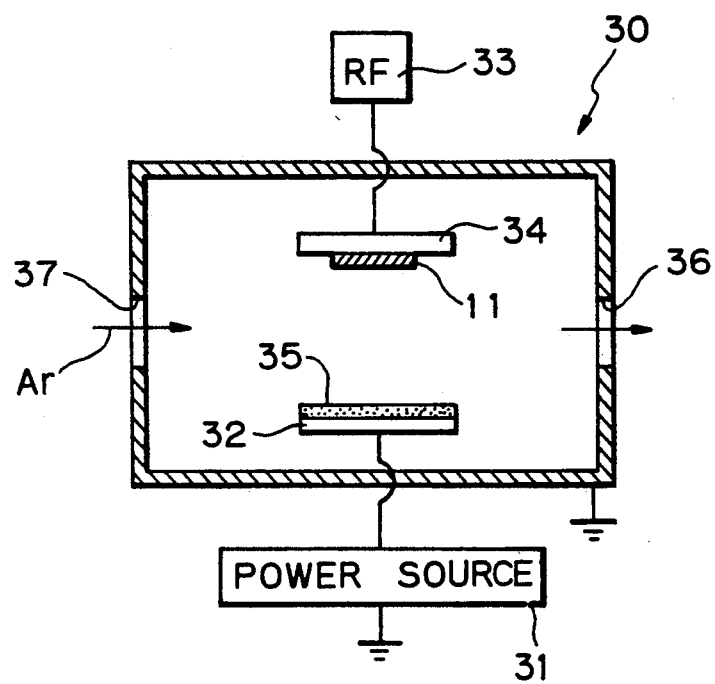
FIG. 3 is a schematic view showing the structure of a sputtering apparatus for producing a thin-layer laminate type magnetic head.

The magnetic head according to the present invention having a structure as shown in FIG. 1 is produced by means of the DC magnetron sputtering device as schematically shown in FIG. 3 and operated under the application of RF bias.

The DC magnetron sputtering device 30 is equipped with a cathode 32 connected to a high voltage-direct current source 31, and a substrate-holder 34 connected to an RF bias power source 33. A target 35 is located on the cathode 32, and a substrate 11 is located on the substrate-holder 34. A vacuum pump (not shown) is provided to suck through one of the openings 36 of the chamber to attain a vacuum, while Ar gas is admitted through the other opening 37.

A magnetic alloy, such as Fe-Si-Al alloy, is used as the target 35.

The substrate 11 is mirror finished on both surfaces. On the mirror finished surfaces a magnetic alloy layer (Sendust layer) is formed by the sputtering method.

On each of these magnetic alloy layers 12 (FIG. 2) an intermediate insulating layer 13 is subsequently formed. For the production of intermediate insulating layers the magnetron sputtering apparatus is used. This is also used for the production of magnetic alloy layers of the Fe-Si-Al alloy and to which the RF bias is applied. A $SiO_2$ film (13) having a thickness of, for example, 0.3 μm is formed on the magnetic film by sputtering the $SiO_2$ target in the Ar gas.

On this intermediate insulating layer 13, the formation of magnetic alloy layers and intermediate insulating layers is repeated several times by the above described method to obtain the magnetic layer structure 14. The total thickness of the magnetic layer structure is 5-40 μm.

Further, a glass film 15 is formed on the magnetic layer structure (14) by ordinary sputtering. A number of cut chips are piled on each other to produce a laminate layer-structure 17. The substrate 16, whose material is the same as that of the substrate 11, is laminated on the glass film 15 to produce a laminate layer-structure.

The laminate layer-structure is fusion bonded at, for example, 650° C. for 15 minutes. Production of magnetic heads is subsequently carried out as described with reference to FIG. 1 in Description of Related Arts.

As is described hereinabove, the properties of the inventive composition enable the provision of a non-magnetic substrate which exhibit both the coefficient of thermal expansion and hardness which are virtually the same as those of the magnetic layer-structure. By means of use of the inventive non-magnetic substrate in a magnetic head, peeling and crack-generation of the magnetic-layer structure can therefore be drastically prevented. In addition, since the inventive non-magnetic substrate is hard, it is possible to prevent the life-shortening of a magnetic head and deformation, such as cracks of the substrate, from occurring. Furthermore, the wear-resistance and durability of a magnetic head are improved.

In addition, since $Al_2O_3$ promotes sintering, high deflecting strength is stably obtained although the conditions of raw material and sintering vary somewhat. Furthermore, great chipping can be prevented during machining, and, hence the yield of the non-magnetic substrates is enhanced.

The present invention is hereinafter described with reference to the Examples.

EXAMPLE 1

CoO and NiO as the raw materials were adjusted and blended to provide a $CoNiO_2$ composition CoO/NiO(mole ratio)=50/50. This was calcined at 1000° C. in an Ar atmosphere and then crushed for 22 hours in a wet ball mill with the use of ethanol.

To this crushed powder was added the $ZrO_2$, which was stabilized by yttria (3 mole % of yttria), in proportion as given in Table 1. They were blended, CIP shaped, and then sintered at 1350° C. in the $O_2$ atmosphere. The obtained green compact was HIP treated under the conditions of 1250° C., 100 MPa and time of 1 hour. The relative density of the HIP treated sintered compact exceeded 99%.

The Vickers hardness (Hv) and coefficient of thermal expansion ($\alpha$:$\mu$m/m° C.—measured at the temperature range of 100° to 400° C.) are shown in Table 1. The properties of barium titanate and the composition with 8% by weight or more of $ZrO_2$ and without $ZrO_2$ are additionally mentioned as comparative examples. It is confirmed that the coefficient of thermal expansion is very low when the additive amount of $ZrO_2$ is 8% by weight or more. The hardness (Hv) is 650 and is undesirably low, when the $ZrO_2$ is not added. It is confirmed that the coefficient of thermal expansion of barium titanate is very low.

TABLE 1

| No. | Additive Amount (wt %) | Hv | $\alpha$ |
| --- | --- | --- | --- |
| 1* | 0 | 650 | 13.6 |
| 2 | 0.1 | 652 | 13.5 |
| 3 | 0.5 | 664 | 13.4 |
| 4 | 1 | 678 | 13.3 |
| 5 | 2 | 692 | 13.2 |
| 6 | 5 | 718 | 13.0 |
| 7 | 7 | 730 | 12.7 |
| 8* | 8 | 735 | 12.4 |
| 9* | 10 | 740 | 12.2 |
| 10* | — | 900 | 9.5 |

The comparative examples are denoted by *. No. 10 is barium titanate.

EXAMPLE 2

CoO and NiO as the raw materials were adjusted and blended to provide CoO/NiO(mole ratio)=35/65.

To this composition (100% by weight) was added 2% by weight of the $ZrO_2$, which was stabilized by yttria (3 mole % of yttria). They were blended for 20 hours in a ball mill with the use of ethanol. The blended powder was calcined at 1000° C. in an Ar gas, and then milled for 40 hours in a wet ball mill with the use of ethanol. The milled powder was CIP shaped, and then sintered at 1350° C. in the $O_2$ atmosphere. The obtained green compact was HIP treated under the conditions of 1250° C., 100 MPa and a time of 1 hour. The relative density of the HIP treated sintered compact exceeded 99%.

Comparative examples without the yttria-stabilized $ZrO_2$ were carried out. In this comparative example, 2% by weight of alumina and 2% by weight of yttria were added, respectively, instead of the yttria-stabilized $ZrO_2$, to the basic composition of the above example (100% by weight). The sintering and HIP treatment were carried out under the same conditions as described above. Each of the thus produced sintered compacts had relative density exceeding 99%.

The coefficients of thermal expansion of the basic compositions with the additives of alumina, yttrium and yttium-stabilized zirconia were 13.8, 14.2, and 14.4 ($\mu$m/m° C.) respectively.

Subsequently, the sintered compacts mentioned above were machined into the form of a magnetic head, without bonding them with the magnetic layer structure. A video deck for test was manufactured by modifying a video deck for business use to one for use with a commercial VTR tape. The sintered compacts were mounted in the test video-deck. The wear test was carried out by reproducing a VTR tape over a long period of time using the test video deck in a room air-conditioned at 23° C. The amount of wear was measured after testing for 300 hours. It was confirmed that the wear resistance was worst with the yttria-addition, better with the alumina-addition, and and best with the yttria-stabilized zirconia addition. When the test was carried out for 1000 hours, the signs of wear of the zirconia-added material were as low as half of those of the alumina-added material. That is, the yttria-stabilized zirconia added material exhibits wear resistance superior to that of the materials with yttria and alumina additions. In addition, the yttria-stabilized zirconia added material exhibits a high coefficient of thermal expansion.

EXAMPLE 3

CoO and NiO as the raw material were adjusted and blended to provide the molar ratio CoO/NiO=35/65. To this basic composition (100% by weight) was added 2% by weight of $ZrO_2$, which had not been stabilized. This mixture was then CIP shaped, calcined at 1000° C., and milled for 40 hours in a ball mill with the use of ethanol. This powder was CIP shaped and then sintered at 1350° C. in the $O_2$ atmosphere. The sintered compact obtained was HIP treated under the conditions of 1250° C., 100 MPa and at time of 1 hour. The relative density of the HIP treated sintered compact exceeded 98%, which is lower than that of Example 2 with the use of the yttria stabilized $ZrO_2$.

The HIP treated sintered compact had a hardness of Hv 660 and an average grain-diameter of 6.5 $\mu$m. These values are inferior to those of Example 2 with the use of the yttria-stabilized zirconia (Hv=700 and 5.7 $\mu$m).

EXAMPLE 4

CoO and NiO as the raw materials were adjusted and blended to provide the molar ratio CoO/NiO=50/50. To this basic composition (100% by weight) was added 2% by weight of $ZrO_2$ and 0.1, 0.4, 1 or 2% by weight of $Al_2O_3$. They were blended for 20 hours in a ball mill with the use of ethanol. The blended powder was calcined at 850° C. in the $N_2$ gas atmosphere. The calcined powder was roughly crushed in a crushing machine and then sieved by a 150 μm mesh. The thus obtained calcined powder was milled for 40 hours in a wet ball mill with the use of ethanol. This powder was CIP shaped and then sintered at 1250° C. for 10 hours in the $O_2$ atmosphere. The obtained sintered compact was HIP treated under the conditions of 1250° C., 100 MPa and at time of 1 hour.

The physical properties of the sintered compacts (under normal pressure) and the HIP treated sintered compacts are given in Table 2. As is apparent from Table 2, the relative density of each sintered compact (under normal pressure) is 98% or more, and the relative density of each HIP treated sintered compact is 99.8% or more. The average grain size was 4–5 μm both for the sintered compacts prior and subsequent to HIP treatment.

TABLE 2

|  | Addition Amount of $Al_2O_3$ (wt %) | Density of Sintered Compact (under normal pressure) (%) | Density after HIP (%) | Grain Size after HIP (μm) |
|---|---|---|---|---|
| Example | 0.1 | 98.2 | 99.8 | 4.1 |
|  | 0.4 | 98.8 | 99.9 | 4.2 |
|  | 1.0 | 99.1 | 99.9 | 4.8 |
|  | 2.0 | 99.3 | 99.9 | 5.0 |
| Comparative Example | 0.05 | 92.5 | 95.8 | 3.8 |
|  | 3.0 | 99.8 | 99.8 | 7.7 |

EXAMPLE 5

$ZrO_2$ in an amount of 7% by weight and $Al_2O_3$ in an amount of 0.05 and 3% by weight, were added to the basic composition of Example 1. The sintered compacts were produced under the same sintering and HIP treatment as in Example 4. The physical properties of the sintered compacts are given in Table 3. As is apparent in this table, the relative density of the sintered compact (under normal pressure) with 0.05% by weight of added $Al_2O_3$ is less than 95%, and the relative density did not increase considerably by HIP treatment.

The relative density of the sintered compact (under normal pressure) with 3% by weight of added $Al_2O_3$ is more than 99%, but, the average grain size was 7 μm and abnormal grains 50 μm or more were detected. The sintered compacts therefore could not exhibit stably high deflecting strength and wear-resistance, and were not appropriate for the non-magnetic substrate for use in a magnetic head.

TABLE 3

|  | Addition Amount of $Al_2O_3$ (wt %) | Density of Sintered Compact (under normal pressure) (%) | Density after HIP (%) | Grain Size after HIP (μm) |
|---|---|---|---|---|
| Example | 0.1 | 95.9 | 99.7 | 3.9 |
|  | 1.0 | 97.2 | 99.8 | 4.5 |
|  | 2.0 | 97.6 | 99.8 | 4.8 |
| Comparative Example | 0.05 | 90.3 | 92.2 | 3.8 |
|  | 3.0 | 97.9 | 99.9 | 7.2 |

We claim:

1. A non-magnetic substrate for use in a magnetic head, said substrate consisting essentially of a basic composition of NiO and optionally CoO and from 0.1 to 7% by weight of an additive based on 100% of the basic composition, said additive being at least one of $ZrO_2$ and $HfO_2$.

2. A non-magnetic substrate for use in a magnetic head, said substrate consisting essentially of a basic composition of NiO and optionally CoO, from 0.1 to 7% by weight of $ZrO_2$, and from 0.1 to 2% by weight of $Al_2O_3$, based on 100% of the basic composition.

3. A non-magnetic substrate according to claim 1 or 2, wherein the $ZrO_2$ is partially stabilized.

4. A non-magnetic substrate according to claim 1 or 2, which has a relative density exceeding 99%.

5. A non-magnetic substrate according to claim 1 or 2, wherein the $ZrO_2$ is present in an amount of 1–3% by weight based on 100% of the basic composition.

* * * * *